Sept. 15, 1925.
H. W. RIECK
GOAT COAT
Filed June 14, 1923 2 Sheets-Sheet 1
1,553,632
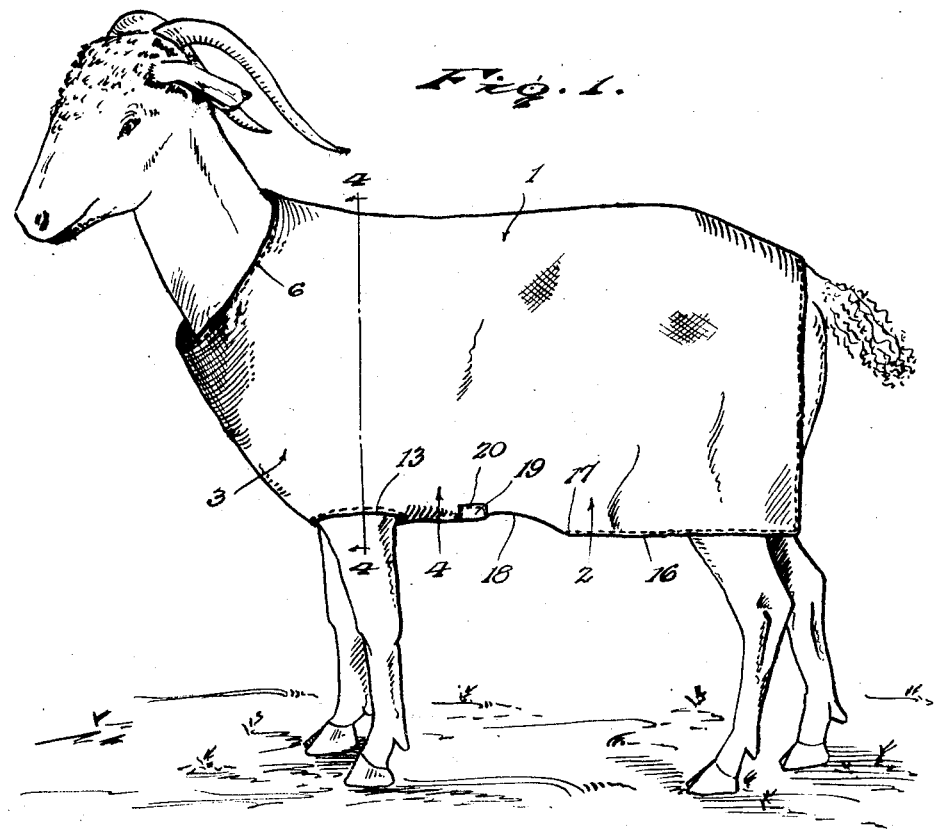
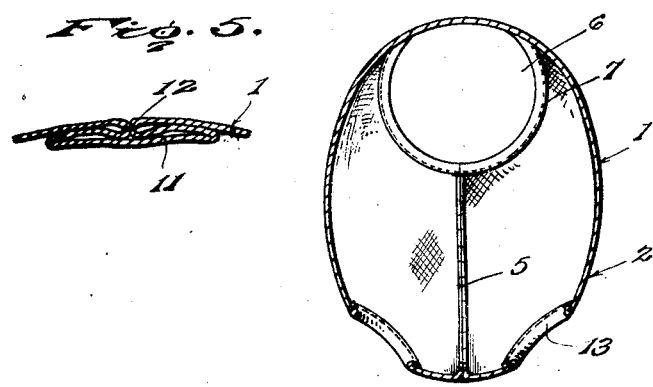
Inventor
H. W. Rieck.

Sept. 15, 1925.

H. W. RIECK

GOAT COAT

Filed June 14, 1923  2 Sheets-Sheet 2

Inventor

H. W. Rieck.

By Lacey & Lacey, Attorneys

Patented Sept. 15, 1925.

1,553,632

UNITED STATES PATENT OFFICE.

HUGH W. RIECK, OF ROOSEVELT, TEXAS.

GOAT COAT.

Application filed June 14, 1923. Serial No. 645,402.

*To all whom it may concern:*

Be it known that I, HUGH W. RIECK, a citizen of the United States, residing at Roosevelt, in the county of Kimble and State of Texas, have invented certain new and useful Improvements in Goat Coats, of which the following is a specification.

The breeding and raising of Angora goats in the United States for the production of mohair and for meat is a growing industry. The Angora goat is a tender, high strung, nervous, and extremely delicate animal and is very susceptible to sudden changes in the weather particularly in the period immediately following shearing. For this reason the animals must be bred and raised in a mild dry climate which is not subject to sudden changes. The shearing is performed twice a year, namely in the early spring and in the fall, and in either season, when the long hair of the animal is removed, it is at the mercy of the elements. As the quality of the hair depends to a great extent upon the breed of the animal, it naturally follows that those furnishing the greatest quantity of hair of excellent quality and being of a more refined breed, are of a more tender nature and therefore more susceptible to sudden weather changes. The critical period extends over thirty days following the shearing operation and if, during this time, the animals are subjected to even a mild rain or a sudden change in temperature, they are liable to die in large numbers. The southwestern portion of the United States and particularly western Texas, parts of Arizona, and New Mexico, afford an ideal climate for the breeding and raising of the animals, with the further advantage that the cheap grazing lands of the semi-arid regions in these States, afford, by reason of their peculiar covering of low stunted brushy growth, an economical grazing area over which the animals may find sustenance. On large ranges, however, it has been found more or less impracticable to provide adequate shelter for the animals. The natural shelter of trees is quite insufficient, and recourse has, therefore, been had to the construction of sheltering sheds upon the ranges. However, even where the vegetation is good and fairly dependable, the range, in the vicinity of the sheds, is liable to soon be "grazed out", and as the sheds are stationary, the animals must, therefore, graze at some distance therefrom. As a consequence it is necessary to employ herders, and even though such shelter is provided and herders are employed, it is found practically impossible to drive the animals from the inadequate shelter of trees and brush into the shed, in the event of a sudden shower. It seems to be the nature of the animal that it will stand shivering in the cold and rain, to the detriment of its health. If the herders are successful in driving the animals into the shed, they will crowd close to one another, seeking warmth, and so close in fact that great numbers will be suffocated.

In consideration of the foregoing it is the primary object of the present invention to provide a coat which may be applied to Angora goats immediately following the shearing operation to protect them from the inclemencies of the weather and thus prevent large numbers of them dying from exposure as has heretofore been the case, thereby not only avoiding the losses entailed through death of the animals but also eliminating the expenses incident to the erection of sheltering sheds and the hire of herders.

Another object of the invention is to provide a coat which may be readily slipped onto the animal to be protected and which will fit or conform to the body contour of the animal in such a way as to most effectually serve its purpose as a protecting medium, protection being afforded the more delicate parts of the anatomy in the most effective manner, and due provision being made for freedom of limb movement. In this connection the invention contemplates the provision of a coat which will be devoid of straps, buckles, or fastenings of any other sort, but which, on the other hand, will be so constructed and designed that when applied to the animal it will fit the body with sufficient closeness to afford the required protection and yet will fit sufficiently loosely to avoid the radiation of heat from the animal's body to the atmosphere and likewise the transfer of cold from the coat to the body so that a maximum degree of warmth is obtained and ample protection afforded for such parts of the body as are most likely to be affected by dampness or cold.

Another object of the invention is to so construct and design the coat that there will be no likelihood of its chafing the body to cause sores which would become infected with the screw worm maggot, the construction and design of the coat being, on the other hand, such as to insure against any disarrangement of the garment and any interference with the limb movement or the natural functions of the animal.

With the foregoing and other objects in view, as will presently be pointed out, the invention resides generally in the structure shown in the accompanying drawings in which, Figure 1 is a perspective view of the coat applied to a shorn Angora goat;

Figure 4 is a vertical transverse sectional view through the coat on the line 4—4 of Figure 1 looking in the direction indicated by the arrows;

Figure 5 is a detail section on the line 5—5 of Figure 3.

Figure 2:
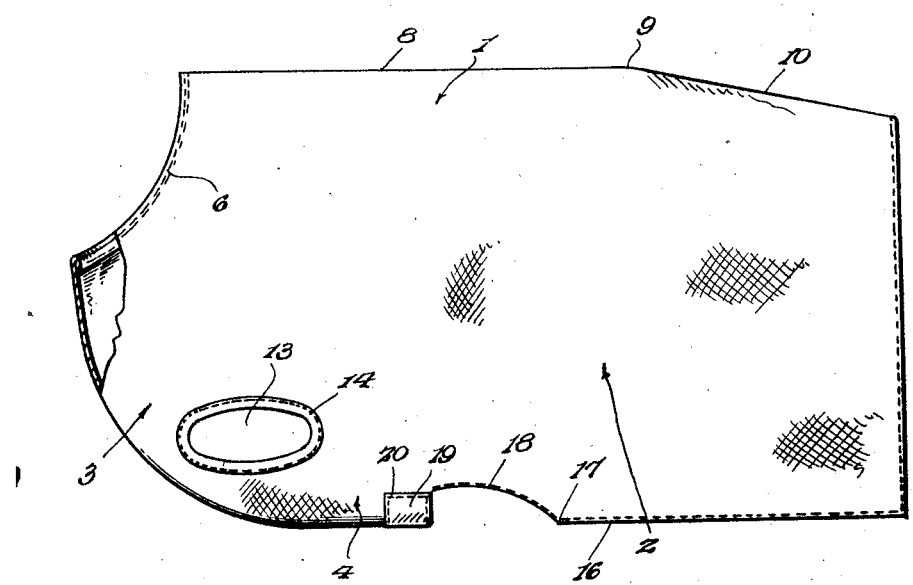
Figure 2 is a side elevation of the coat, a portion of the front being broken away.

The coat embodying the invention is preferably made from a single piece of material, in order to effect economy and to avoid a multiplicity of seams, and for this purpose canvas, cotton duck, or in fact any other material found suitable for the purpose may be employed, it being understood that I am not to be limited to the use of any particular material. The coat comprises, generally speaking, a back portion indicated in general by the numeral 1, side portions 2, a breast portion 3, and a bottom portion 4. As stated, the coat is preferably formed from a single piece of material, and in the manufacture of the coat, a blank of the proper marginal contour is cut from a piece of cloth of suitable size, and the blank is folded longitudinally medially along what will constitute the back 1 of the coat in its completed form, certain marginal portions of the blank being united to each other by a seam 5 extending longitudinally along the breast portion 3 and bottom portion 4 of the coat. This seam constitutes practically the only seam, properly defined as such, which is present in the garment except one which will hereinafter be referred to, so that the liability of the garment being torn open is greatly lessened as compared with a structure in which the garment would be made up of a number of pieces of material united by many seams. The front of the coat, between the forward end of the back portion 1 and the upper end of the breast portion 3, is provided with a neck opening indicated by the numeral 6 which is preferably hemmed at its margin as indicated by the numeral 7. The opposite sides of the neck opening 6 do not extend on a diagonal line, as will be evident by reference to Figure 2 of the drawings, but are preferably extended on an inwardly curved line as shown in the said figure. As a consequence, the neck opening 6 may be spread open to a greater diameter than would be possible if its sides extended on a diagonal line, and therefore the neck portion of the coat may be slipped over the head of the goat down to the base of one horn, and the neck opening stretched across to the tip of the opposite horn and the said neck portion then slipped down over the last mentioned horn to clear the same, whereupon the neck portion will encircle the neck of the animal with a desired degree of snugness and yet without binding or chafing.

Figure 3:
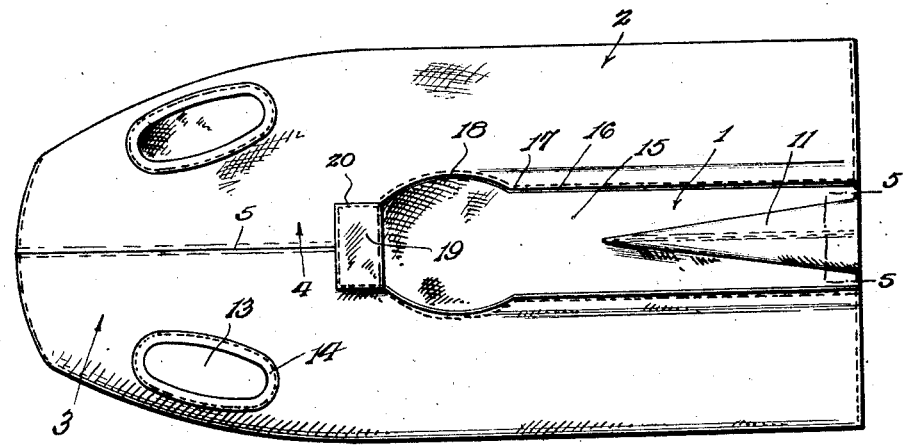
Figure 3 is a bottom view of the coat.

From the upper side of the neck opening 6, the back portion 1 of the coat extends rearwardly on a substantially straight line as indicated by the numeral 8 and to a point 9, located, in the applied position of the coat, substantially above the forward portions of the hips of the animal. From this point the back 1 is extended along a downwardly and rearwardly inclined line as indicated by the numeral 10, this contour being effected by forming a plait 11 in the said back portion 1, gradually increasing in transverse dimensions from the point 9 to the rear end of the said back portion as shown in Figure 3 of the drawings, and permanently established by a line of stitching or a seam 12 as most clearly shown in Figure 5. By referring now to Figure 1 of the drawings it will be observed that the provision of the plait 11 not only serves to shape the upper side of the back portion 1 so that it will conform closely to the contour of the back of the animal but also forms, in effect, a pad which prevents the seam produced by the line of stitching 12 from chafing or rubbing the animal's back.

The breast portion 3 is gradually curved downwardly and rearwardly from the lower side of the neck opening 6 and merges with the bottom portion 4 as clearly shown in Figures 1 and 2 of the drawings, and it will be evident by an inspection of Figure 1 that the breast portion will effectually cover and protect the breast of the animal and that the bottom portion 4 will likewise cover and protect the under side of the body of the animal between the fore legs.

To accommodate the animal's fore legs, the front portion of the coat is provided, substantially at the forward side of the bottom portion 4 and lower or rear side of the breast portion 3, with oppositely located openings indicated by the numeral 13 and preferably hemmed, as at 14. In the applied position of the coat, the openings 13 will more or less snugly receive the upper portion of the fore legs of the animal although this portion of the coat will not fit so closely as to in any way interfere with the natural limb movements. On the other hand, the fit is sufficiently snug to insure of automatic adjustment of the coat, in the act of the animal walking, should the coat for any reason become slightly disarranged or displaced. In other words, while there is perfect freedom of movement of the fore legs and no likelihood of chafing, should the coat, for example, become rearwardly shifted upon the animal's body or, on the other hand, forwardly shifted, the strides taken by the fore legs in the act of walking will immediately serve to readjust the coat to its properly arranged position. In order that the garment may be applied to the animal, it is only necessary that the fore legs be, in turn, bent back at the knee joint and inserted, in this position, through the respective leg opening 13, these openings being of sufficient dimensions to permit of this being done and being preferably of the elliptical form shown in Figures 2 and 3 of the drawings.

It will be observed that the bottom portion 4 of the coat is closed but that rearwardly of this portion, the bottom of the coat is left open as indicated by the numeral 15, the margins of this portion of the coat being indicated by the numeral 16, and from a point 17, located in the rear of the fore legs of the animal, being continued along straight substantially horizontal lines to the rear end of the coat. Between the point 17 and the rear end of the closed bottom portion 4, however, the margins 16 are recessed or cut away along upwardly curved lines as indicated by the numeral 18. Between the marginal portions 18, the said rear end of the bottom portion 4 is preferably reinforced by a piece of material 19 which is folded upon itself and has one of its folds disposed above and the other fold beneath the said bottom portion and secured thereto by lines of stitching 20.

The coat having been applied to the goat and adjusted to the position shown in Figure 1 of the drawings, the breast portion 3 will effectually cover and protect the chest of the animal without in any way interfering with the movement of its head and neck in grazing, and without chafing the animal, this portion conforming to the general contour of the chest and breast bone of the animal without actual binding contact. The leg openings 13 are so designed and positioned that they will scarcely touch the fore legs except when movements and positions assumed by the animal would disarrange the coat, in which case the natural strides taken in the act of walking will automatically immediately adjust the coat to proper position, and all chafing contact will cease. In a similar manner the back 1 of the coat will rest more or less snugly upon and conform to the contour of the back of the animal without, however, binding the back to interfere with any ordinary body movements, so that the animal is not, in this respect, inconvenienced in any way. At this point it is important to note that by inclining the rear portion of the back downwardly and rearwardly, as at 10, a diagonal line of stress is imposed upon the sides 2 of the coat between this portion of the back and the cut away marginal portions 18 with the result that the sides 2 of the coat are cupped toward the body of the animal thus adapting the rear portions of the said sides 2 to fit relatively close to the body and likewise prevent outward curling up of the corner portions of the said sides 2. In this manner the sides of the coat are caused to lie as close as is possible to the sides of the animal's body and yet without binding the rump or hips or in anyway interfering with freedom of movement of the rear legs. It will be evident that if it were not for the provision of the cut away marginal portions 18, this result would not be obtained.

In general, the coat is, as will be evident, devoid of straps, buckles, and other fastening devices which would be liable to catch in the brush and interfere with the movements of the animal if not entirely arresting its progress. Notwithstanding the absence of such fastening devices, the coat is capable of being readily and quickly slipped onto the animal and is as readily removable, and yet when once applied there is no possible way in which it can work loose from the animal or, in fact, even become so disarranged as to expose any portion of the body of the animal to the elements. The coat offers no impediment whatsover to perfect freedom of body movement and consequently does not annoy the animal, interfere with its grazing, or otherwise restrict its freedom of movement. Owing to the relative looseness of the garment, it does not so tightly fit the body of the animal as to act as a conductor of body heat to the cold atmosphere with consequent radiation of warmth followed by chilling of the animal, nor does it, on the other hand, permit the atmospheric cold to be conducted to the animal's body.

Due to the fact that the bottom of the coat is open rearwardly of a point close to the fore legs of the animal, and there is an absence of straps extending beneath the body of the animal, the coat offers no impediment to the performance of the natural functions of the animal, and this is a feature of considerable importance in view of the fact that uncleanliness is practically certain to develop screw worm and wool maggot infection. Furthermore, inasmuch as the coat covers the greater portion of the body of the animal, the small shearing cuts which ordinarily develop worm cases, shortly after shearing, are covered and protected. In this connection it is important to note that a suitable screw worm fly repellant may be applied to the material of the coat, and preferably in a water-proofing compound, the coat being treated with such composition of material after it has been manufactured, and the repellant and the water-proofing compound serving their respective purposes. It will also be understood that the use of the coat permits of a herd of nanny goats being kidded in selected situations for good grazing, etc., whereas heretofore, in a great many instances, it has been necessary to confine this to the limitation of shed location where the grazing is poor on account of previous herding.

In the foregoing description, particular reference has been made to the use of the coat embodying the invention, upon goats, but it will be obvious that the coats may be employed with full advantage upon sheep and other hair or fur bearing animals, with or without slight modifications in the structural contour, as may be found expedient.

Not only does the article embodying the invention present the advantages and effectually serve the useful purposes hereinbefore outlined, but it may likewise be employed to cover and protect the animal before shearing, thus permitting the animal to be sheared thirty to forty days later in the spring thus advancing the shearing period to a time when there is little danger of losses from exposure. The use of the coat in this manner prevents the loss of mohair through shedding, and, by reason of the sweating of the oils into the fleece, effects the imparting of a beautiful luster to the fleece and a considerable increase in weight of the fleece.

Having thus described the invention, what is claimed as new is:

1. An animal's coat comprising top, side, and front portions, the coat being provided with a neck opening and with openings for the fore legs of the animal, the back of the coat being formed with a plait permanently established by a line of stitching, said plait extending longitudinally of the back of the coat from an intermediate point to the rear end and gradually increasing in width in the direction of said rear end whereby the said top will be inclined downwardly and rearwardly from an intermediate point to the rear end of the coat, said plait serving to house the stitching and prevent chafing of the animal's back.

2. An animal's coat comprising top, side, and front portions, the coat being provided with a neck opening and with openings for the fore legs of the animal, the back of the coat being formed with a plait extending longitudinally thereof from an intermediate point to the rear end and gradually increasing in width in the direction of said rear end whereby the said top will be inclined downwardly and rearwardly from an intermediate point to the rear end of the coat, and a line of stitching securing the said plait, the said plait being flattened and arranged flat wise beneath the said portion of the top of the coat thereby to house the line of stitching and prevent chafing of the animal's back.

3. An animal's coat permanently closed at the front and at the fore part of the bottom and provided with a neck opening the walls of which are concave, and adjacent the juncture of the said front and said fore part of the bottom being provided with leg openings, the sides of the coat rearwardly of the said fore part of the bottom being mutually free from connection, and the lower margins of said sides, immediately adjacent and in rear of the closed bottom portion of the coat, being cut away on upwardly curved lines, the rear portion of the top of the coat being formed with a plait inclined downwardly and rearwardly from an intermediate point to the rear end of the said coat, and a line of stitching securing the plait, said plait serving to house the line of stitching and prevent chafing of the animal's back.

4. An animal's coat permanently closed at the front and at the fore part of the bottom and provided with a neck opening and with leg openings adjacent the juncture of the said front and said fore part of the bottom, the sides of the coat rearwardly of the said fore part of the bottom being mutually free from connection, the lower margins of said sides immediately adjacent and in rear of the closed bottom portion of the coat being cut away on upwardly curved lines, the rear portion of the top of the coat being inclined downwardly and rearwardly from an intermediate point to the rear end of the said coat, and the lower marginal edges of the sides of the coat rearwardly of the upwardly curved portions being disposed in substantially the same horizontal plane as the closed fore part of the bottom and being mutually disconnected.

5. An animal's coat having its front and the fore part of its bottom permanently closed, the said closed front extending downwardly and rearwardly along a curved line merging into said fore part of the bottom, the coat being provided at the upper side of the front with a neck opening and being likewise provided in its opposite sides near its bottom with openings for the fore legs of the animal, the top of the coat being inclined downwardly and rearwardly from a point intermediate its ends to its rear end, and the sides of the coat being disconnected at their rear and lower margins in the rear of the closed fore part of the bottom of the coat and having a portion of their lower margins cut away on upwardly curved lines immediately in rear of the said closed fore part of the bottom and the remaining portion of their lower margins disposed in substantially the same horizontal plane with said closed fore part.

In testimony whereof I affix my signature.

HUGH W. RIECK. [L. S.]